May 10, 1960

W. W. HERRICK ET AL 2,936,170

DOCUMENT FEEDING AND TIMING DEVICE

Filed Dec. 10, 1956

INVENTORS
William Wilson Herrick
Einar W. Tangard

BY Edwin H. Owen
ATTORNEY

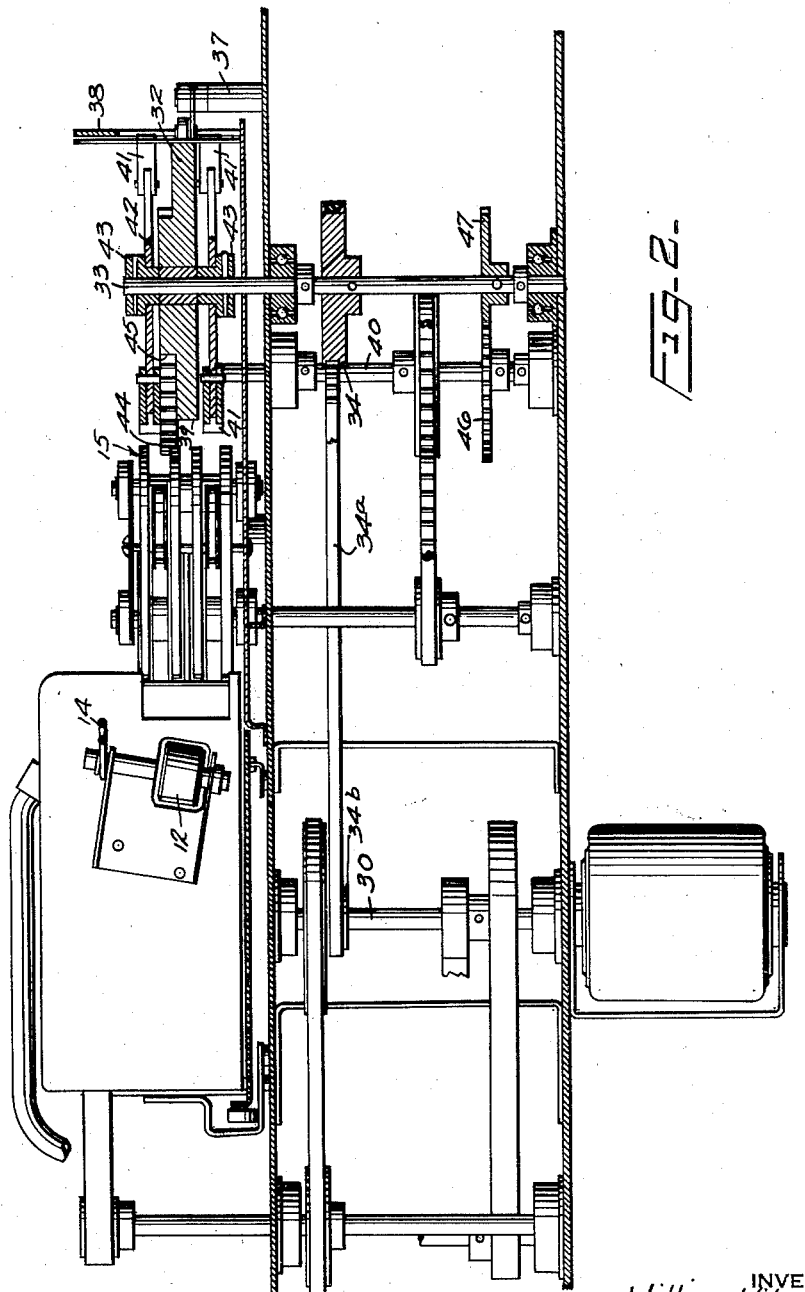

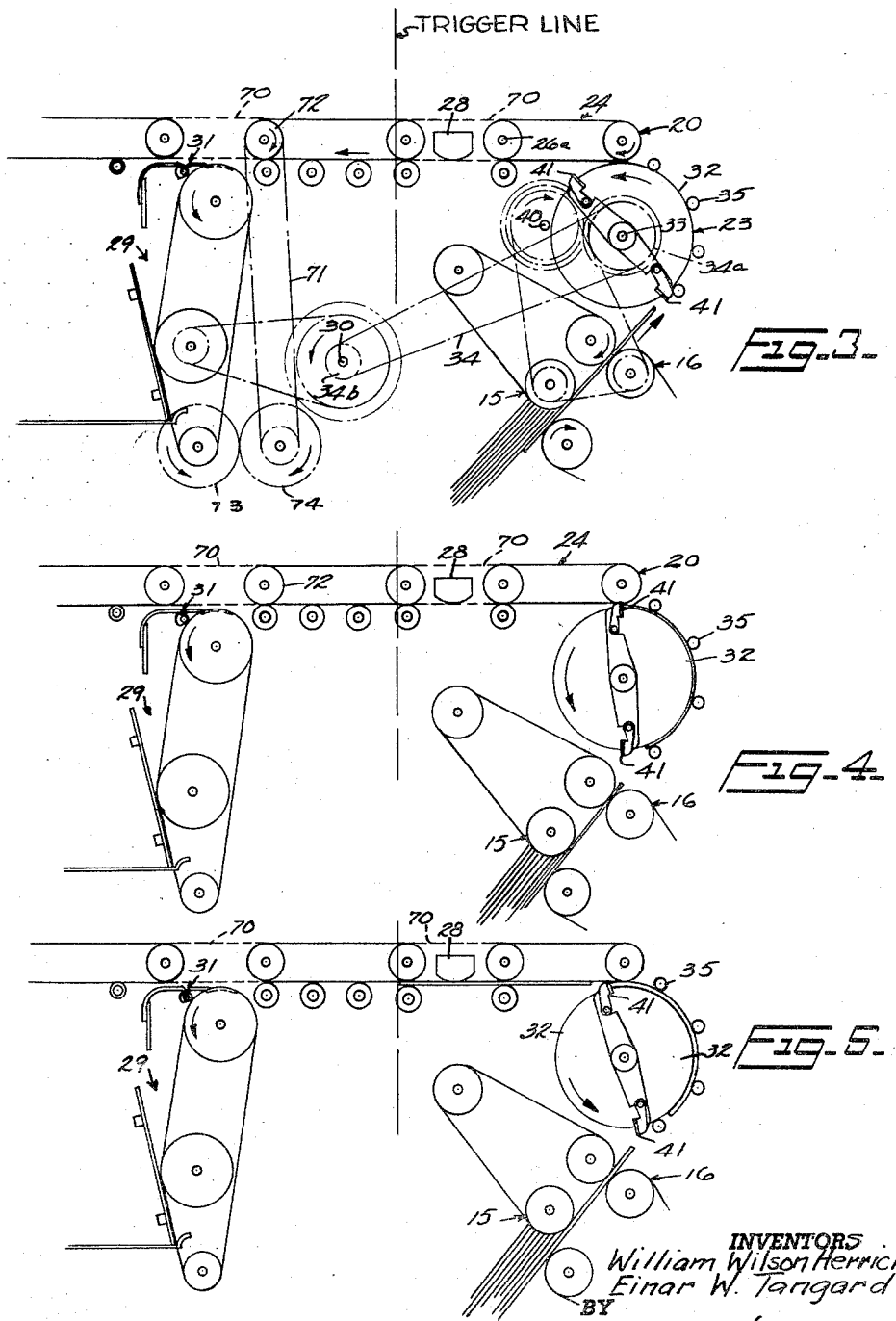

INVENTORS
William Wilson Herrick
Einar W. Tangard
BY
ATTORNEY

May 10, 1960 W. W. HERRICK ET AL 2,936,170
DOCUMENT FEEDING AND TIMING DEVICE
Filed Dec. 10, 1956 5 Sheets-Sheet 5

INVENTORS
William Wilson Herrick
Einar W. Tangard
BY
ATTORNEY

United States Patent Office 2,936,170
Patented May 10, 1960

2,936,170

DOCUMENT FEEDING AND TIMING DEVICE

William Wilson Herrick, Stamford, and Einar W. Tangard, Norwalk, Conn., assignors to Pitney-Bowes, Inc., Stamford, Conn., a corporation of Delaware Application December 10, 1956, Serial No. 627,315

10 Claims. (Cl. 271—12)

This invention relates to a device which is to be used with a document processing machine for the purpose of synchronizing the movement of a document with a conveying means associated with processing, after each document leaves the initial separating and feeding operation in sequence.

The present invention is disclosed in part in patent application Serial No. 602,191.

It is one object of the invention to provide means whereby the speed of the document feed is increased after it leaves its initial feeding position to move the leading edge thereof into engagement with other means which is movable at the rate of feed required to convey the document past the processing device.

It is another object to provide a document feeding disc, the peripheral surface of which will effect the feed of the document at an increased speed after the document leaves its initial feeding position and to obstruct the path of the leading edge of the document by moving means which will eventually cause the document to move at the speed required to convey the document past the processing devices.

It is a further object to provide for the adjustment of the means engaged by the leading edge of the document to thereby provide for the accurate timing thereof relative to the elements which convey the document past the processing devices.

A preferred arrangement of the invention is disclosed in the accompanying drawings, wherein:

Fig. 2 is a vertical sectional view taken substantially along the line 2—2 of Fig. 1;

Figs. 3 through 8 are diagrammatical operational views showing the document advancing through several stages of operation from the initial feeding position to a stacking position;

Figure 1:
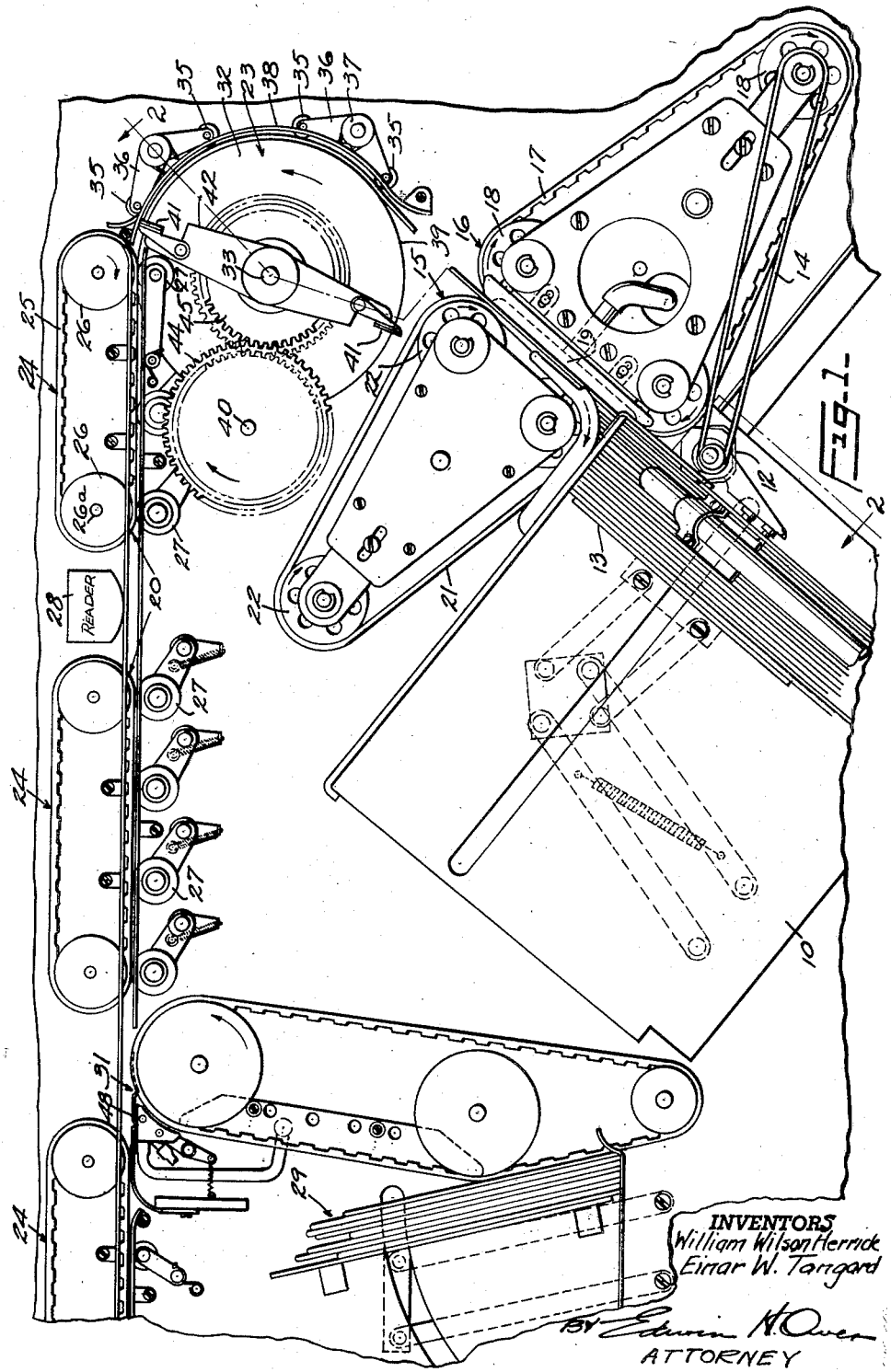
Fig. 1 is a plan view showing the general arrangement of a document feed and separating means with a timing unit, conveying means and a stacker unit with means for gating documents thereto.

Documents such as checks are supported on edge on a platform 10 and are normally moved toward an agitator element 12 by means of a spring urged backing plate 13. The agitator element 12 is continuously driven to effect movement of the foremost documents in the direction of separating and feeding members 15 and 16 respectively. Said feeding member 16 comprises a driven belt structure wherein a plurality of toothed timing belts 17 move at high speed around pulleys 18, the pulleys being preferably arranged in a three-cornered triangular order. Associated with the feeding belts 17 are vacuum chambers 19 which cooperate with openings in the belts to draw the leading end of the document to the belts and thereby move the document along the distance of the vacuum chamber.

The separating member 15 comprises a plurality of belts 21 which are supported by three pulleys 22 arranged in a triangular order and are driven in a direction opposed to the drive of the document feed belts 17. The frictional coefficient of the surfaces of the belts 21 is greater than that of the surfaces of the belts 17 to thereby prevent the feed of a check until the openings in the belts 17 are within the area of the vacuum chamber 19. Hence the foremost document is fed only when the leading surface thereof is drawn to the belt 17 by the vacuum and all checks immediately behind the foremost check are prevented from moving in the direction of the foremost check by the reverse feed belts 21. The separator and feed belt mechanism is completely described in the aforementioned patent application.

The documents will not be discharged from the document feed and separating structure in an exact timed relation, that is, some gain or lag will occur.

For the purpose of correcting the feed of the document so that it will become synchronized with a conveyor feed generally indicated at 20, a timing device 23 is interposed between the initial feed described above and the conveyor feed 20.

The conveyor feed consists of a number of driven belt units 24, each of which comprises a toothed timing belt 25 supported by pulleys 26—26, one of which pulleys will be driven. Cooperating with one reach of each of the belts 25 are spring impressed roller elements 27 which cooperate with the said belts to feed the document along a determined path.

Between one pair of the belt units 24 is a reading station 28 suitably arranged for the reading of code or other data on the surface of the document by electronic or other suitable means. Between other conveyor belt structures are document gating stations 31 provided for the purpose of directing documents to respective stacking stations 29 as determined by the code or other data on the checks and read while passing through the reading station.

In order to correctly time each document to the exact speed of the conveying belt structures 24, the previously stated timing device 23 is provided. Said timing device comprises a disc 32, freely mounted on a shaft 33, which shaft is driven through a pulley and belt drive 34—34a from a motor driven pulley 34b on shaft 30, as best shown in Fig. 2. Cooperating with the peripheral surface 39 of the disc 32 are rollers 35 carried by arms 36 which are normally urged toward said peripheral surface and are supported by brackets 37. A guide rail 38 is also provided to assist in guiding the documents around the peripheral surface of the disc.

Above and below the said disc and extending beyond the peripheral surface thereof are fingers 41, which fingers are pivotally mounted on arms 42. The arms 42 are supported in bearings 43 pinned to the shaft 33, and hence are driven by the pulley and belt drive 34—34a, the speed of which is synchronized with the speed of the feed belts 25. The disc 32 is driven by gearing 44, 45 at a speed which is greater than the speed of movement of the arms 42 and their associated fingers 41. Hence the document upon being engaged by the peripheral surface 39 of the disc 32 is accelerated to move the leading end thereof into engagement with one pair of fingers 41—41, the movement of which will effect the proper timing of the document before the latter engages with the first feed belt 25. The gear 44 is secured to a shaft 40 which shaft is driven from the shaft 33 by means of 1:1 ratio gears 46, 47.

In Figs. 3 and 4, the operation is illustrated wherein the document is shown as advancing toward the pickup position of the timing device 23 in Fig. 3 and with the leading end of the document engaging the fingers 41 as in Fig. 4. While moving from the position of Fig. 3 to the position of Fig. 4 the document end engages with the fingers 41 and remains in engagement therewith until the feed of the document is taken over by the conveyor feed 20. After engagement of the end of the document with the fingers 41, a slight slipping action will occur at the point of engagement between the disc periphery 39 and the surface of the document.

In Fig. 5 the first document is shown as having advanced to the reading position while a second document has progressed through the timing device 23.

Figure 6:
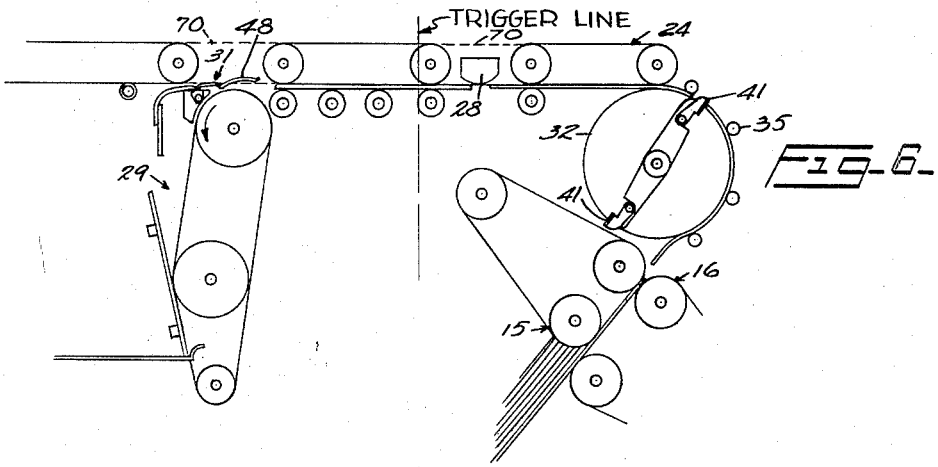
Figure 7:
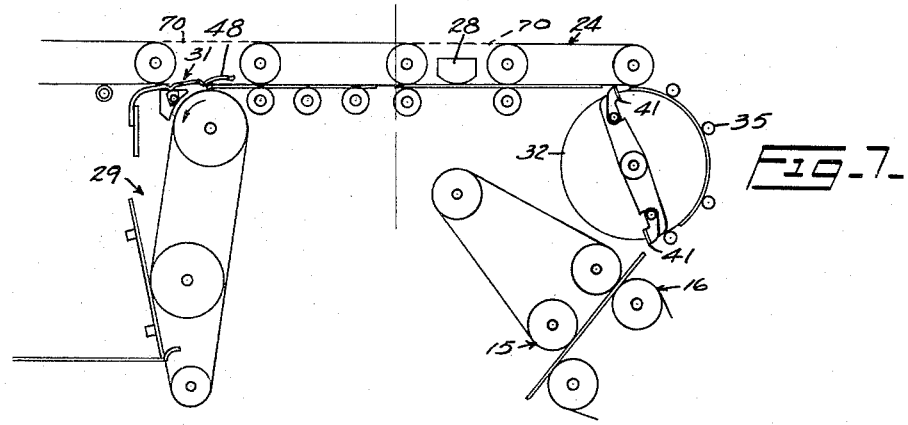
Figure 8:
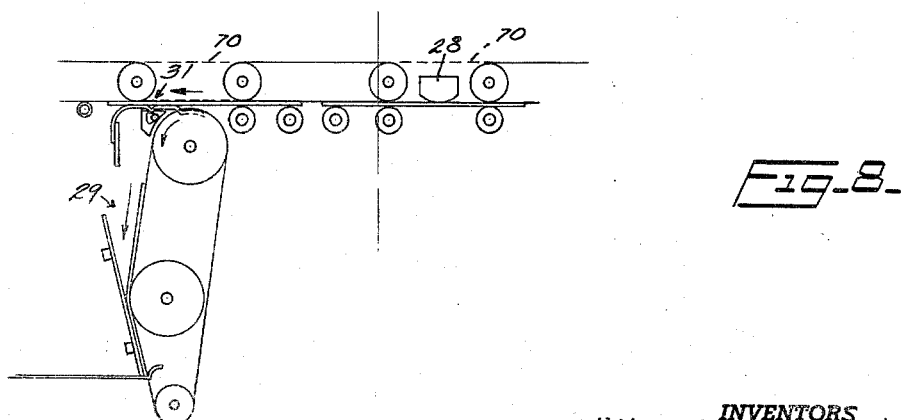

In Fig. 6 the first document is shown approaching one of the gating stations 31 which is shown with the gate 48 open, whereby the document is deflected into the stacking station 29 as shown in Fig. 7 and continues to a stacking position as in Fig. 8.

After passing through the reading position, the document effects a triggering operation to cause the gating mechanism to function at one of several stacking stations in accordance with the data read. Suitable electronic controls are provided to accomplish the gating operations but inasmuch as said controls form no part of the present invention they have not been included.

When effecting the initial timing of the machine or at any period that retiming becomes necessary, the position of the fingers 41 are adjusted to a positoin wherein the leading edge of the document will be within a predetermined distance in advance of the leading end of the document. The accelerated speed of the disc 32 will then cause the said leading end to overtake the fingers to thus synchronize the document speed to that of the conveyor feed 20. Adjustment of the finger position can be effected by disconnecting the belt 34a from its associated pulley 34 on shaft 33.

Figure 9:
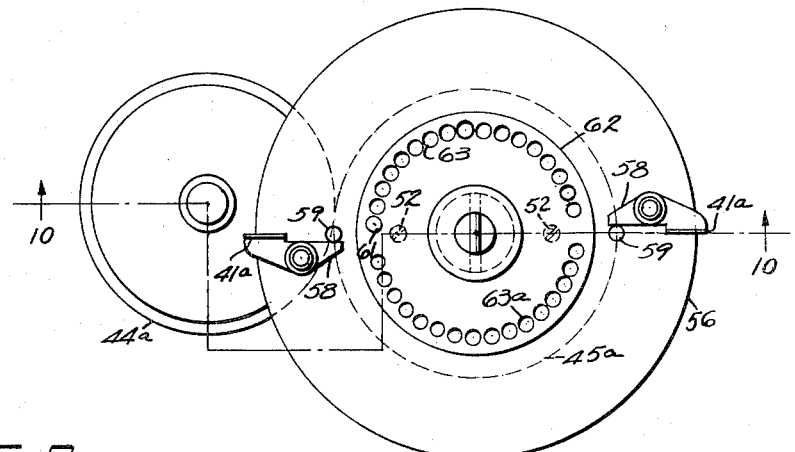
Fig. 9 is a plan view showing a modified arrangement of the document timing unit to provide for the rapid adjustment thereof.
Figure 10:
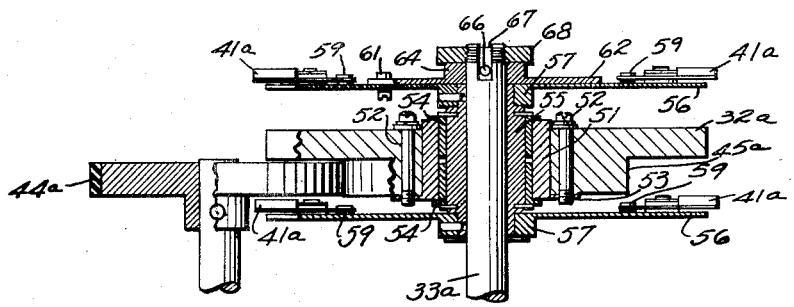
Fig. 10 is a vertical sectional view taken on the line 10—10 of Fig. 9.

To provide for easier adjustment of the position of the fingers 41 another arrangement is shown in Figs. 9 and 10. Here the disc designated as 32a, is secured to a sleeve 51 by means of bolts 52 secured to a flange portion 53 thereof and the sleeve is assembled to freely rotate about two end bushings 54—54. The disc assembly, involving the above parts, is carried by a sleeve 55 which sleeve is supported by shaft 33a.

Two circular plates 56—56 have hub portions 57—57 secured to the upper and lower ends of sleeve 55. Fingers 41a—41a are pivotally supported 180° apart on the upper surfaces of each of the plates 56—56 and have tail portions 58—58 which normally bear against stop pins 59—59. A pin 61 is also secured to and projects upwardly through the upper plate 56. Cooperating with said pin 61 is a circular plate 62 having a predetermined number of holes 63—63a arranged circumferentially therein in the manner shown in Fig. 9. A hub 64 forming a part of the plate 62 has a pin 66 fixed therein, which pin engages a slot 67 located in the end of shaft 33a. By means of the arrangement of the plate 62, through the connection of the pin 61 with one of the holes 63—63a, also the pin and slot connection 66, 67, the combined elements function as a driving connection between the shaft 33a and the sleeve 55.

When it becomes necessary to make a timing adjustment, the plate 62 is raised sufficiently to disengage same from its driving relation with the pin 61 to free the plate 56 for adjustment. If one of the holes 63 does not provide the desired position of adjustment, the plate 56 may be rotated 180° to permit the pin 61 to engage one of the holes 63a which are located halfway between the locations of the holes 63. When the desired position of adjustment is attained, the plate 62 is returned to its lowered driving position. A nut 68 is provided to lock the plate in its adjusted position.

A plan view of a drive for the parts described is diagrammatically illustrated in Fig. 3. In addition to the drive elements previously referred to, there is a timing belt and pulley drive 71, 72 suitably driven through gearing 73, 74 to effect the drive of the conveyor belt units. Intermediate toothed drive belts or the equivalent are provided between each conveyor belt unit 24 as indicated at 70. The drives disclosed are for the purpose of illustration only and may be accomplished in any other desirable manner. A modified drive is indicated for example in Figs. 9 and 10, wherein a frictional drive is provided by the driven friction wheel 44a and driven portion 45a instead of the gear drive shown in Fig. 1 at 44 and 45.

From the above it will be seen that the entry of the leading end of the document into the conveyor feed 20 will be controlled by the fingers 41 which fingers are initially set relative to the bite of the first conveyor belt 25 and pressure roller 27 (O position) when the gating mechanism 31 is in a predetermined position. With the entry of the document under proper control at the conveyor position, the selected gate will always operate at the time required for the document to enter its respective stacker.

What is claimed is:

1. In a document processing machine, separating and feeding means to feed documents in sequence, document processing means including reading and gating devices, document conveying means having a constant speed for moving a document relative to the reading and gating devices, a timing device between the sequence feeding means and the conveying means to cause the document to pass to the conveying means at a precise timed relation for control by the reading and gating devices, said timing device including a feeding element, means to move said feeding element at a speed greater than the speed of the conveying means, a movable document retarding element in the path of the leading end of the document, and means to move said retarding element at the speed of the conveying means.

2. In a sheet like document processing machine, separating and feeding means to feed documents in sequence, document processing means including reading and gating devices, document conveying means having a constant speed for moving a document relative to the reading and gating devices, a timing device between the sequence feeding means and the conveying means to cause the document to pass to the conveying means at a precise timed relation for control by the reading and gating devices, said timing device including a document feeding disc having a peripheral document feeding surface, means to move said peripheral feeding surface at a speed greater than the speed of the conveying means, a document retarding element extending beyond the disc periphery in the path of the leading end of the document, and means to move said retarding element at the speed of the conveying means.

3. In a sheet like document processing machine, separating and feeding means to feed documents in sequence, document processing means including reading and gating devices, document conveying means having a constant speed for moving a document relative to the reading and gating devices, a timing device between the sequence feeding means and the conveying means to cause the document to pass to the conveying means at a precise timed relation for control by the reading and gating devices, said timing device including a document feeding disc rotatable about a vertical axis and having a peripheral document feeding surface, means to move said peripheral feeding surface at a speed greater than the speed of the conveying means, document retarding fingers movable about the disc axis in the path of the leading end of the document, and means to move said retarding fingers at the speed of the conveying means.

4. In a sheet like document processing machine, separating and feeding means to feed documents in sequence, document processing means including reading and gating devices, document conveying means having a constant speed for moving a document relative to the reading and gating devices, a timing device between the sequence feeding means and the conveying means to cause the document to pass to the conveying means at a precise timed relation for control by the reading and gating devices, said timing device including a document feeding disc rotatable about a vertical axis and having a peripheral document feeding surface, means to move said peripheral feeding surface at a speed greater than the speed of the conveying means, document retarding fingers positioned above and below the disc surface and movable about the disc axis in the path of the leading end of the document, and means to move said retarding fingers at the speed of the conveying means.

5. In a sheet like document processing machine, separating and feeding means to feed documents in sequence, document processing means including reading and gating devices, document conveying means having a constant speed for moving a document relative to the reading and gating devices, and a timing device between the sequence feeding means and the conveying means to cause the document to pass to the conveying means at a precise timed relation for control by the reading and gating devices and including a document feeding disc rotatable about a vertical axis and having a peripheral document feeding surface rotating at a speed greater than the speed of the conveying means, a disc having a finger supported thereon extending into the path of the leading end of the document, means to move the latter disc at the speed of the conveying means and including a driven plate having adjustment holes circumferentially located therein, and a coupling pin in the finger supporting disc engageable with a selected hole, selection being obtained by disengaging the driven plate from the coupling pin and rotating the finger supporting disc until the finger is in a desired position relative to the document feed, then reengaging the pin with the opening selected.

6. A device as defined in claim 5 wherein a plurality of fingers are mounted on the disc.

7. A device as defined in claim 5 wherein two finger supporting discs are provided above and below the document feeding disc, each finger supporting disc having a plurality of fingers associated therewith.

8. A device as defined in claim 5 wherein the finger is free to yield in one direction.

9. A device as defined in claim 5 wherein two fingers are supported by the finger supporting disc and are positioned 180° apart.

10. A device as defined in claim 5 wherein two groups of adjustment holes are provided 180° apart with the holes of one group located substantially equivalent to a halfway position between the holes of the other group when the finger supporting disc is rotated to move the opposite group of openings relative to said coupling pin.

References Cited in the file of this patent
UNITED STATES PATENTS

| | | |
|---|---|---|
| 1,991,003 | Stevens | Feb. 12, 1935 |
| 2,245,396 | Harrold et al. | June 10, 1941 |
| 2,708,514 | Maul | May 17, 1955 |